US009338386B2

(12) United States Patent
Jung et al.

(10) Patent No.: US 9,338,386 B2
(45) Date of Patent: May 10, 2016

(54) METHOD AND APPARATUS TO PROVIDE BROADCASTING PROGRAM INFORMATION ON SCREEN OF BROADCAST RECEIVER

(75) Inventors: Taeung Jung, Suwon-si (KR); Hyowon Lee, Dublin (IE); Yoonhee Choi, Suwon-si (KR); Alan Francis Smeaton, Dublin (IE); Cathal Gurrin, Dublin (IE)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 12/429,538

(22) Filed: Apr. 24, 2009

(65) Prior Publication Data

US 2009/0271823 A1    Oct. 29, 2009

Related U.S. Application Data

(60) Provisional application No. 61/071,365, filed on Apr. 24, 2008.

(30) Foreign Application Priority Data

Oct. 29, 2008    (KR) .......................... 10-2008-0106575

(51) Int. Cl.
*H04N 21/43*    (2011.01)
*H04N 5/445*    (2011.01)
*H04N 21/422*    (2011.01)
*H04N 21/431*    (2011.01)
(Continued)

(52) U.S. Cl.
CPC ....... *H04N 5/44543* (2013.01); *H04N 21/4221* (2013.01); *H04N 21/4312* (2013.01); *H04N 21/4345* (2013.01); *H04N 21/4438* (2013.01); *H04N 21/4821* (2013.01)

(58) Field of Classification Search
USPC .......................................................... 725/39
See application file for complete search history.

(56) References Cited

U.S. PATENT DOCUMENTS 4,613,950 A * 9/1986 Knierim et al. ................. 702/89
6,041,311 A    3/2000 Chislenko et al.
(Continued)

FOREIGN PATENT DOCUMENTS

CN    1329795    1/2002
CN    1507266    6/2004
(Continued)

OTHER PUBLICATIONS

International Search dated Nov. 24, 2009 in International Patent Application PCT/KR2009/002153.
(Continued)

*Primary Examiner* — Cai Chen
(74) *Attorney, Agent, or Firm* — Staas & Halsey LLP

(57) ABSTRACT

Disclosed is a method of providing broadcasting program information, the method including obtaining electronic program guide (EPG) information, extracting first program information from the obtained EPG information, the first program information being program information with respect to all channels, generating second program information based on the first program information, the second program information being information regarding first programs currently being broadcast and second programs to be displayed next in each of the channels, and displaying the generated second program information and a vertical line or a horizontal line indicating a current time on a screen.

49 Claims, 7 Drawing Sheets

(51) Int. Cl.
*H04N 21/434* (2011.01)
*H04N 21/443* (2011.01)
*H04N 21/482* (2011.01)

(56) References Cited

U.S. PATENT DOCUMENTS

| | | | |
|---|---|---|---|
| 6,243,142 B1 | 6/2001 | Mugura et al. | |
| 6,536,041 B1 | 3/2003 | Knudson et al. | |
| 6,577,350 B1 | 6/2003 | Proehl et al. | |
| 6,754,904 B1 | 6/2004 | Cooper et al. | |
| 6,934,964 B1 | 8/2005 | Schaffer et al. | |
| 7,499,995 B2 | 3/2009 | Armstrong | |
| 7,503,013 B2 | 3/2009 | Donoghue et al. | |
| 7,574,668 B2 | 8/2009 | Nunez et al. | |
| 7,895,625 B1 | 2/2011 | Bryan et al. | |
| 7,908,303 B2 | 3/2011 | Fein et al. | |
| 7,917,583 B2 | 3/2011 | Angiolillo et al. | |
| 7,996,869 B2 | 8/2011 | Tu et al. | |
| 8,024,765 B2 | 9/2011 | Ramanathan et al. | |
| 8,850,477 B2 | 9/2014 | Schein et al. | |
| 2002/0046402 A1 | 4/2002 | Akinyanmi et al. | |
| 2002/0078448 A1* | 6/2002 | Wakahara | 725/39 |
| 2002/0112239 A1 | 8/2002 | Goldman | |
| 2002/0144264 A1 | 10/2002 | Broadus | |
| 2002/0152224 A1 | 10/2002 | Roth et al. | |
| 2002/0199186 A1 | 12/2002 | Ali et al. | |
| 2003/0066074 A1 | 4/2003 | Zimmerman et al. | |
| 2004/0250280 A1* | 12/2004 | Allport | 725/56 |
| 2005/0021507 A1* | 1/2005 | Yamamoto | 707/3 |
| 2005/0055713 A1 | 3/2005 | Lee et al. | |
| 2005/0141542 A1 | 6/2005 | Handekyn et al. | |
| 2005/0204388 A1* | 9/2005 | Knudson | H04N 5/44543 725/58 |
| 2005/0278737 A1* | 12/2005 | Ma et al. | 725/40 |
| 2006/0020973 A1 | 1/2006 | Hannum et al. | |
| 2006/0024029 A1* | 2/2006 | Yamashita et al. | 386/83 |
| 2006/0026635 A1 | 2/2006 | Potrebic et al. | |
| 2006/0053449 A1 | 3/2006 | Gutta | |
| 2006/0059260 A1 | 3/2006 | Kelly et al. | |
| 2006/0075432 A1 | 4/2006 | Abbadessa et al. | |
| 2006/0143653 A1 | 6/2006 | Suh | |
| 2006/0168007 A1 | 7/2006 | Peters | |
| 2006/0271961 A1 | 11/2006 | Jacoby et al. | |
| 2006/0271997 A1 | 11/2006 | Jacoby et al. | |
| 2006/0282789 A1 | 12/2006 | Kim | |
| 2006/0282856 A1 | 12/2006 | Errico et al. | |
| 2007/0019926 A1 | 1/2007 | Lee | |
| 2007/0028266 A1 | 2/2007 | Trajkovic et al. | |
| 2007/0083892 A1 | 4/2007 | Yun et al. | |
| 2007/0113251 A1 | 5/2007 | Otsu | |
| 2007/0229651 A1 | 10/2007 | Nakajima | |
| 2007/0245382 A1 | 10/2007 | Doi et al. | |
| 2007/0250863 A1 | 10/2007 | Ferguson | |
| 2007/0277217 A1 | 11/2007 | Chiang | |
| 2008/0244681 A1 | 10/2008 | Gossweiler et al. | |
| 2008/0270561 A1 | 10/2008 | Tang et al. | |
| 2009/0019488 A1 | 1/2009 | Ruiz-Velasco et al. | |
| 2009/0077220 A1 | 3/2009 | Svendsen et al. | |
| 2009/0133066 A1* | 5/2009 | Choi | 725/40 |
| 2009/0133069 A1 | 5/2009 | Conness et al. | |
| 2009/0241160 A1 | 9/2009 | Campagna et al. | |
| 2009/0254942 A1 | 10/2009 | Matsuzaki | |
| 2013/0035114 A1 | 2/2013 | Holden et al. | |

FOREIGN PATENT DOCUMENTS

| | | |
|---|---|---|
| CN | 1513261 | 7/2004 |
| CN | 1561588 A | 1/2005 |
| CN | 1656805 A | 8/2005 |
| CN | 1947416 | 4/2007 |
| CN | 101119169 | 2/2008 |
| CN | 101507266 | 8/2009 |
| EP | 1 694 070 A1 | 8/2006 |
| EP | 1818930 | 8/2007 |
| JP | 6-504165 | 5/1994 |
| JP | 10-294904 | 11/1998 |
| JP | 11-225297 | 8/1999 |
| JP | 11-266408 | 9/1999 |
| JP | 2004-194344 | 7/2004 |
| JP | 2005-505192 | 2/2005 |
| JP | 2005-57713 | 3/2005 |
| JP | 2005-78627 | 3/2005 |
| JP | 2005-117226 | 4/2005 |
| JP | 2005-160063 | 6/2005 |
| JP | 2005-165454 | 6/2005 |
| JP | 2005-526331 | 9/2005 |
| JP | 2006-108929 | 4/2006 |
| JP | 2006-295572 | 10/2006 |
| JP | 2007-123980 | 5/2007 |
| JP | 2007-142643 | 6/2007 |
| JP | 2007-228226 | 9/2007 |
| JP | 2008-67370 | 3/2008 |
| JP | 2006-333476 | 12/2008 |
| KR | 10-2001-0034608 | 4/2001 |
| KR | 2002-0016537 | 3/2002 |
| KR | 10-2004-0033075 | 4/2004 |
| KR | 10-2005-0007413 | 1/2005 |
| KR | 10-2005-0026312 | 3/2005 |
| KR | 10-2005-0053225 | 6/2005 |
| KR | 10-0609962 | 8/2006 |
| KR | 10-065445 | 12/2006 |
| KR | 10-2007-0039434 | 4/2007 |
| KR | 10-0717691 | 5/2007 |
| KR | 10-2007-0075638 | 7/2007 |
| KR | 10-2007-0098732 | 10/2007 |
| KR | 10-2007-0100966 | 10/2007 |
| KR | 10-0763180 | 10/2007 |
| KR | 10-2007-0118702 | * 11/2007 |
| KR | 10-0782872 | 12/2007 |
| TW | 351905 A | 2/1999 |
| TW | 460839 | 10/2001 |
| WO | WO 97/49242 | 12/1997 |
| WO | WO 99/48287 | 9/1999 |
| WO | 00/62223 | 10/2000 |
| WO | 01/60064 A2 | 8/2001 |
| WO | 03/030418 A2 | 4/2003 |
| WO | WO 03/036970 | 5/2003 |
| WO | 03/098932 A1 | 11/2003 |
| WO | 2004/052010 A1 | 6/2004 |
| WO | 2005/048587 | 5/2005 |
| WO | WO 2006/074304 | 7/2006 |
| WO | 2007/003045 A1 | 1/2007 |

OTHER PUBLICATIONS

International Search dated Dec. 9, 2009 in International Patent Application PCT/KR2009/002152.
U.S. Advisory Action mailed Nov. 30, 2011 in co-pending U.S. Appl. No. 12/385,917.
U.S. Final Office Action mailed Aug. 17, 2011 in co-pending U.S. Appl. No. 12/385,917.
U.S. Office Action mailed Feb. 28, 2011 in co-pending U.S. Appl. No. 12/385,917.
U.S. Appl. No. 12/382,058, filed Mar. 6, 2009, Chang-hwan Choi et al., Samsung Electronics Co., Ltd.
U.S. Appl. No. 12/385,917, filed Apr. 23, 2009, Chang-hwan Choi et al, Samsung Electronics Co., Ltd.
Jorge Abreu et al. "2BeOn—Interactive Television Supporting Interpersonal Communication," Proceedings of the Eurographics Workshop on Multimedia, XP-002457155, Sep. 8, 2001, pp. 1-10.
Alcatel: "AmigoTV: A Social TV Experience Through Triple-Play Convergence," Feb. 4, 2005, XP002457156, retrieved from http://www1.alcatel-lucent.com/com/en/appcontent/apl/T0205-Amigo_TV-EN_tcm172-195461635.PDF, 10 pages.
Hyowon Lee et al., "Balancing Simplicity and Functionality in Designing User-Interface for an Interactive TV," Centre for Digital Video Processing, Adaptive Information Cluster, Dublin City University, Ireland (2 pages).
Extended European Search Report dated Nov. 29, 2011 from European Patent Application No. 09734083.0.
Extended European Search Report dated Jan. 13, 2012 from European Patent Application No. 09735218.1.

(56) References Cited

OTHER PUBLICATIONS

Chinese Office Action dated May 22, 2012, in Chinese Patent Application No. 200980114498.1.
Chinese Office Action dated Aug. 10, 2012, in Chinese Patent Application No. 200910139212.7.
Chinese Office Action dated Jul. 25, 2012, in Chinese Patent Application No. 200980114500.5.
U.S. Office Action mailed Jun. 6, 2012 in co-pending U.S. Appl. No. 12/382,058.
Chinese Office Action dated Apr. 12, 2013 from Chinese Patent Application No. 200980114500.5.
European Search Report dated Aug. 31, 2011 from European Patent Application No. 09158383.1-1241.
Makoto Hamada et al., "Information-Provision System using Users' History for Ubiquitous Computing and Networking Environments", The Institute of Electronics, Information and Communication Engineers, Mar. 2008, pp. 119-122.
Japanese Office Action dated Sep. 4, 2012, in Japanese Patent Application No. 2011-506204.
Chinese Office Action issued Jan. 18, 2013 in corresponding Chinese Patent Application No. 200980114498.1.
Japanese Office Action issued Jan. 29, 2013 in corresponding Japanese Patent Application No. 2009-106871.
Chinese Office Action dated Jul. 29, 2013 from Chinese Patent Application No. 200980114498.1, 12 pages.
European Communication pursuant to Article 94(3) EPC dated Aug. 28, 2013 from European Patent Application No. 09734083.0, 7 pages.
Japanese Office Action dated Jul. 30, 2013 from Japanese Patent Application No. 2011-506204, 5 pages.
European Communication pursuant to Article 94(3) EPC dated Aug. 28, 2013 from European Patent Application No. 09735218.1, 6 pages.
European Communication pursuant to Article 94(3) EPC dated Aug. 22, 2013 from European Patent Application No. 09158383.1, 5 pages.
U.S. Office Action mailed Dec. 18, 2012 in co-pending U.S. Appl. No. 12/382,058.
U.S. Office Action mailed Dec. 23, 2013 in co-pending U.S. Appl. No. 12/382,025, 17 pages.
U.S. Office Action mailed May 7, 2014 in co-pending U.S. Appl. No. 12/385,917, 47 pages.
Chinese Rejection mailed Feb. 18, 2014 from Chinese Patent Application No. 200980114498.1, 17 pages.
Chinese Office Action dated May 7, 2014 from Chinese Patent Application No. 200980114500.5, 12 pages.
U.S. Office Action dated Aug. 1, 2014 from U.S. Appl. No. 12/382,058.
U.S. Office Action dated Oct. 6, 2014 from U.S. Appl. No. 12/385,917.
Korean Office Action dated Oct. 23, 2014 from Korea Patent Application No. 10-2008-0106574, 10 pages.
Korean Office Action dated Sep. 22, 2014 from Korean Patent Application No. 10-2008-0106575, 8 pages.
Korean Office Action dated Aug. 19, 2014 from Korean Patent Application No. 10-2008-0106573, 7 pages.
Advisory Action dated Oct. 29, 2014 from U.S. Appl. No. 12/382,058.
Chinese Office Action dated Sep. 30, 2014 from Chinese Patent Application No. 200980114500.5, 13 pages.
U.S. Notice Allowance dated Jul. 6, 2015 in U.S. Appl. No. 12/385,917.
Korean Office Action dated Feb. 13, 2015 from Korean Patent Application No. 10-2008-0106574, 7 pages.
Korean Notice of Allowance dated Mar. 16, 2015 from Korean Patent Application No. 10-2008-0106575, 7 pages.
Chinese Office Action dated Dec. 21, 2015 from Chinese Patent Application No. 201310337366.3, 18 pages.
Korean Notice of Allowance dated Jun. 4, 2015 in Korean Patent Application No. 10-2008-0106574, 7 pages.
Chinese Office Action dated Dec. 21, 2015 from Chinese Patent Application 201310337366.3 (18 pages including partial translation).
Notice of Allowance dated Oct. 5, 2015 from U.S. Appl. No. 12/382,058.

* cited by examiner

METHOD AND APPARATUS TO PROVIDE BROADCASTING PROGRAM INFORMATION ON SCREEN OF BROADCAST RECEIVER

CROSS-REFERENCE TO RELATED APPLICATIONS

This application claims the benefit of U.S. Provisional Application No. 61/071,365, filed on Apr. 24, 2008, in the U.S. Patent and Trademark Office, and the benefit of Korean Patent Application No. 10-2008-0106575, filed on Oct. 29, 2008, in the Korean Intellectual Property Office, the disclosures of which are incorporated herein in their entirety by reference.

BACKGROUND

1. Field

One or more embodiments relate to a method and an apparatus to provide broadcasting program information on a screen of a digital broadcasting receiver.

2. Description of the Related Art

As media environments become an important infrastructure of the modern economy, various stations for conventional terrestrial broadcasting, cable broadcasting, internet television (TV) broadcasting, etc. have been established. In the case of digital broadcasting, program information generated by broadcast stations are provided by using either a program and system information protocol (PSIP) or a network if the PSIP cannot be used, and TVs analyze the program information and provide the analyzed information as tables to users. The program information is referred to as electronic program guide (EPG) information, and users can obtain information regarding currently broadcast programs and programs to be broadcast in the future by browsing the EPG information.

Accordingly, modern TVs provide EPG screens so that users can obtain program information with respect to each channel, and thus methods of effectively using EPG information are researched in various ways, regardless of whether in the hardware field or in the software field. For example, the main reasons users refer to EPG information are being analyzed. Accordingly, it has been determined that the most important information to users is information regarding programs currently being broadcast and programs to be broadcast next, rather than information regarding all programs, and such information should be provided via a user-friendly interface with minimum viewing interruption. However, most conventional EPG screens fail to satisfy these requirements, and other EPG screens only provide limited information regarding current channels.

SUMMARY

One or more embodiments include a method and an apparatus to provide broadcasting program information on a screen of a digital broadcasting receiver more efficiently.

Additional aspects will be set forth in part in the description which follows and, in part, will be apparent from the description, or may be learned by practice of the invention.

To achieve the above and/or other aspects, one or more embodiments may include a method of providing broadcasting program information on a screen of a digital broadcasting receiver, the method including obtaining electronic program guide (EPG) information; extracting first program information from the obtained EPG information, the first program information being program information with respect to all channels; generating second program information based on the first program information, the second program information being information regarding first programs currently being broadcast and second programs to be displayed next in each of the channels; and displaying the generated second program information and a vertical line or a horizontal line indicating a current time on the screen.

The display of the generated second program information and the line indicating the current time may further include calculating a first point of time at which a last second program in each of the channels starts, the second program information being displayed translucently on a side of the screen to display program information regarding second programs in all channels, based on the first point of time.

The display of the generated second program information and the line indicating the current time may further include calculating a first time interval by determining a difference between the current time and the first point of time; calculating a second time interval by multiplying a predetermined rate and the calculated first time interval; calculating a second point of time by adding the second time interval to the first point of time; and displaying a horizontal time axis of a screen displaying the second program information within the second point of time.

In the displaying of the generated second program information and the line indicating the current time, the screen of the second program information may be adjusted according to a predetermined proportion ratio.

In the displaying of the generated second program information and the line indicating the current time, progress information of first programs currently being broadcast in each channel may also be displayed.

The method may further include receiving an input from a user using directional keys disposed on a user interface device to control the digital broadcasting receiver to select a first program or a second program in a channel from the second program information; and displaying at least one of program information and related images regarding the selected first program or the second program as pop-up windows.

The method may further include receiving an input from a user using hot-keys disposed in a user interface device to select a first channel from among channels with respect to the first program or the second program; and displaying third program information including information regarding all programs in the selected first channel for all time slots on a side of the screen.

The display of the third program information may further include replacing the displayed third program information by displaying fourth program information including information regarding all programs in a second channel for all time slots by using the directional keys disposed on the user interface device, the second channel being a channel before or after the first channel.

The method may further include receiving an additional input from the user using the directional keys to select a third program in a channel in a time slot from the third program information or the fourth program information; and setting a recording function, a reserve recording function, or a remind function with respect to the selected third program.

The method may further include switching a screen of the digital broadcasting receiver by tuning to the first program or the third program when the first program or the third program is currently being broadcast.

To achieve the above and/or other aspects, one or more embodiments may include an apparatus to provide broadcasting program information on a screen of a digital broadcasting receiver, the apparatus including an electronic program guide (EPG) storage unit obtaining EPG information; an EPG extracting unit extracting first program information from the obtained EPG information, the first program information being program information with respect to all channels; a NOW/NEXT EPG generating unit generating second program information from the extracted first program information, the second program information being information regarding first programs currently being broadcast and second programs to be displayed next in each of the channels; and a screen display unit displaying the generated second program information and a vertical line or a horizontal line indicating a current time in the screen.

The screen display unit may further include a time processing unit calculating a first point of time at which a last second program in a channel starts, the second program information being displayed translucently on a side of the screen to display program information regarding second programs in all channels, based on the first point of time.

The time processing unit may calculate a first time interval by determining a difference between the current time and the first point of time, calculate a second time interval by multiplying a predetermined rate and the calculated first time interval, and calculate a second point of time by adding the second time interval to the first point of time, and the screen display unit may display a horizontal time axis of a screen displaying the second program information within the second point of time.

The screen display unit may adjust the screen of the second program information according to a predetermined proportion ratio.

The screen display unit may also display progress information of first programs currently being broadcast in each channel.

The apparatus may further include a first program selecting unit selecting a first program or a second program in channels displayed on a NOW/NEXT EPG information screen in response to an input by a user using directional keys disposed on a user interface device to control the digital broadcasting receiver; and a pop-up displaying unit displaying at least one of program information and related images regarding the selected first program or the second program selected as pop-up windows.

The apparatus may further include a channel selecting unit selecting a first channel from among channels with respect to the first program or the second program in response to an input from a user using hot-keys disposed on the user interface device; and a brief EPG information displaying unit displaying third program information regarding all programs in the selected first channel for all time slots.

The brief EPG information displaying unit may further include a program information switching unit switching from the displayed third program information to display fourth program information including information regarding all programs in a second channel for all time slots in response to a user using the directional keys disposed on the user interface device in the screen, the second channel being a channel before or after the first channel.

The apparatus may further include a second program selecting unit selecting a third program in a channel in a time slot from the third program information or the fourth program information in response to an additional input from a user using the directional keys; and a function setting unit setting a recording function, a reserve recording function, or a remind function with respect to the selected third program.

The apparatus may further include a screen switching unit switching a screen of the digital broadcasting receiver by tuning to the first program or the third program when the first program or the third program is currently being broadcast.

To achieve the above and/or other aspects, one or more embodiments may include a computer readable recording medium having recorded thereon a computer program to cause a processor to execute the method of providing broadcasting program information.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF EMBODIMENTS

Figure 1:
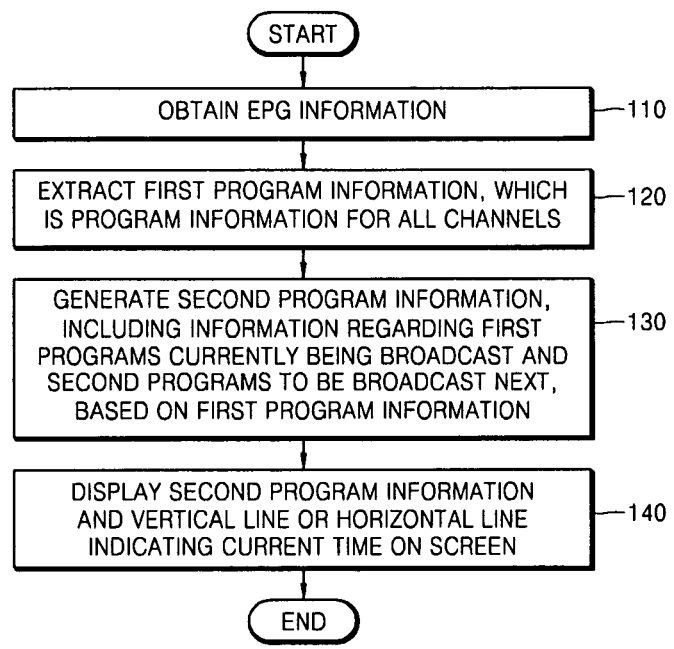
FIG. 1 is a flowchart of a method of providing broadcasting program information in a screen of a digital broadcasting receiver, according to an embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present invention.

To resolve the most important demands of users, the present embodiments are meant to suggest a method in which information regarding programs currently being broadcast and programs to be broadcast next for all channels can be easily obtained, viewing interruptions can be minimized, and electronic program guide (EPG) information can be displayed in an interface more easily than that in the related art.

EPG information can be shown either fully or briefly. Hereinafter, a method of fully showing EPG information will be referred as a full EPG method, and a method of briefly showing EPG information will be referred as a brief EPG method. EPG information may be shown on a screen that is, for example, either opaque or translucent.

Information regarding all channels and all programs should be provided according to the full EPG method, and thus it is necessary to occupy most regions of a screen. Thus, the brief EPG method may be used such that a viewer can briefly view EPG information. However, according to the brief EPG method, information regarding a current channel or information regarding current programs for all channels are shown. Furthermore, even in the brief EPG method, many portions of a screen are also occupied, thus often causing viewing interruptions.

The present embodiments provide a method according to which viewing interruptions may be minimized when providing EPG information, information regarding programs currently being broadcast, programs to be broadcast next, and the broadcast programs most demanded by viewers, can easily be obtained, and EPG information can be manipulated via an interface more easily than those in the related art.

FIG. 1 is a flowchart of a method of providing broadcasting program information in a screen of a digital broadcasting receiver, according to an embodiment.

Referring to FIG. 1, the method of providing broadcasting program information in a screen of a digital broadcasting receiver, according to an embodiment, includes an operation 110 of obtaining EPG information, an operation 120 of extracting first program information, which is program information for all channels, from the obtained EPG information, an operation 130 generating second program information, which includes information regarding first programs currently being broadcast and second programs to be broadcast next based on the first program information, and an operation 140 displaying the generated second program information and either a vertical line or a horizontal line indicating a current time on the screen.

Here, while the first program information includes information regarding broadcasting programs for all time slots in all channels, the second program information only includes information regarding programs currently being broadcast and programs to be broadcast next in all channels. Here, according to modified exemplary embodiments, information regarding two or more programs to be broadcast next may be included in the second program information.

Furthermore, when displaying such second program information in a screen, geometric shapes may be used to visualize current time information. In the present embodiments, a vertical line or a horizontal line will be used to visualize current time.

Figure 2:
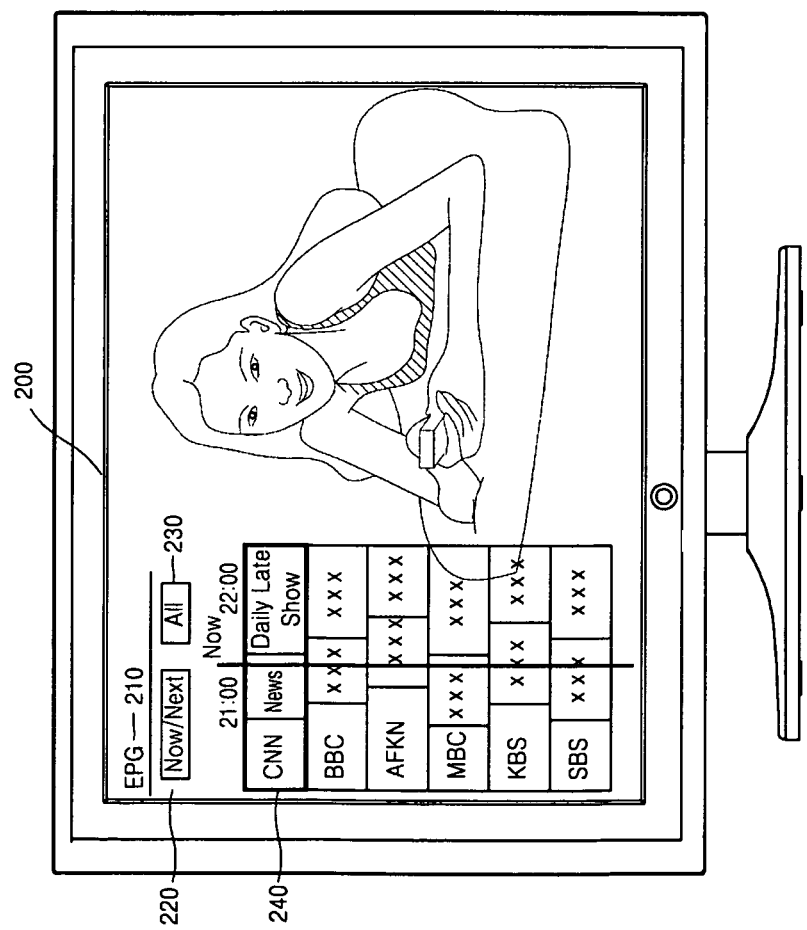
FIG. 2 is a diagram showing a screen of a digital broadcasting receiver, according to an embodiment.

When the second program information is displayed on a screen, in the case where a list of channels is displayed along the vertical axis of the screen and time information is displayed along the horizontal axis of the screen, a line indicating the current time may be a vertical line (e.g. referring to FIG. 2). In contrast, in the case where a list of channels is displayed along the horizontal axis of the screen and time information is displayed along the vertical axis of the screen, the line indicating the current time may be a horizontal line.

Referring to FIG. 2, an embodiment of second program information in which a list of channels is displayed along the vertical axis of a screen and time information is displayed along the horizontal axis of the screen will be described below.

FIG. 2 is a diagram showing a screen of a digital broadcasting receiver, according to an embodiment.

Referring to FIG. 2, EPG information 210 is displayed on the left side of a main TV screen 200, for example. As described above, users want to find out desired information quickly and easily. In the case of EPG information, information regarding programs currently being broadcast and programs to be broadcast next is information desired by users. However, EPG information is displayed according to either the full EPG method displaying all channels and all programs therein or according to a method of displaying all programs in a current channel. Thus, it is inconvenient for users to move through a plurality of screens to obtain information regarding specific programs currently being broadcast and/or to be broadcast next. Furthermore, it is inconvenient for users to switch channels to obtain information regarding programs broadcasted and/or to be broadcast in other channels.

As shown in FIG. 2, the NOW/NEXT EPG information 210 includes a NOW/NEXT menu 220 and an ALL menu 230 presented as icons. The second program information can be viewed by selecting the NOW/NEXT menu 220, whereas information regarding all programs in a selected channel can be viewed by selecting the ALL menu 230. The ALL menu 230 will be described in detail later by referring to FIG. 5.

Meanwhile, the arrangement of menus shown in FIG. 2 is merely an example of the present embodiments, and the menus may be arranged otherwise, so long as information regarding programs currently being broadcast and/or to be broadcast next can be displayed with the time line. Furthermore, to minimize viewing interruptions, the NOW/NEXT EPG information 210 may be displayed translucently on a side of the TV screen 200, and the displayed size of the NOW/NEXT EPG information 210 may be adjusted in predetermined proportion to a size of the TV screen. Furthermore, progress information of a program currently being broadcast in each channel may also be displayed, and the progress information may be displayed in a different color, for example, for easy recognition.

A vertical NOW line shown in FIG. 2 indicates current time information, which helps the user to determine the progress of programs currently being broadcast in each channel (CNN, BBC, AFKN, etc.) 240 as of the current time and helps to easily determine when the programs will end.

The NOW/NEXT EPG information 210 displays information regarding programs currently being broadcast and programs to be broadcast next in all channels. Here, the following should be considered when configuring a screen. In the case where time intervals are fixed in the time axis, e.g., 10 minutes or 30 minutes, if a time slot for a program currently being broadcast in a particular channel is significantly longer (e.g. 5 hours) as compared to programs in other channels, information regarding a program to be broadcast next in the corresponding channel may not be displayed due to the physical size of the TV screen 200. As a worst case scenario in the above case, information regarding programs to be broadcast next in all channels may not be displayed in the NOW/NEXT EPG information 210.

To resolve the above problem, time regions to display information regarding programs to be broadcast next on the screen should be calculated by considering a point of time T1 at which the last program to be broadcast next starts. Descriptions thereof will be given below by referring to FIG. 3.

Figure 3:
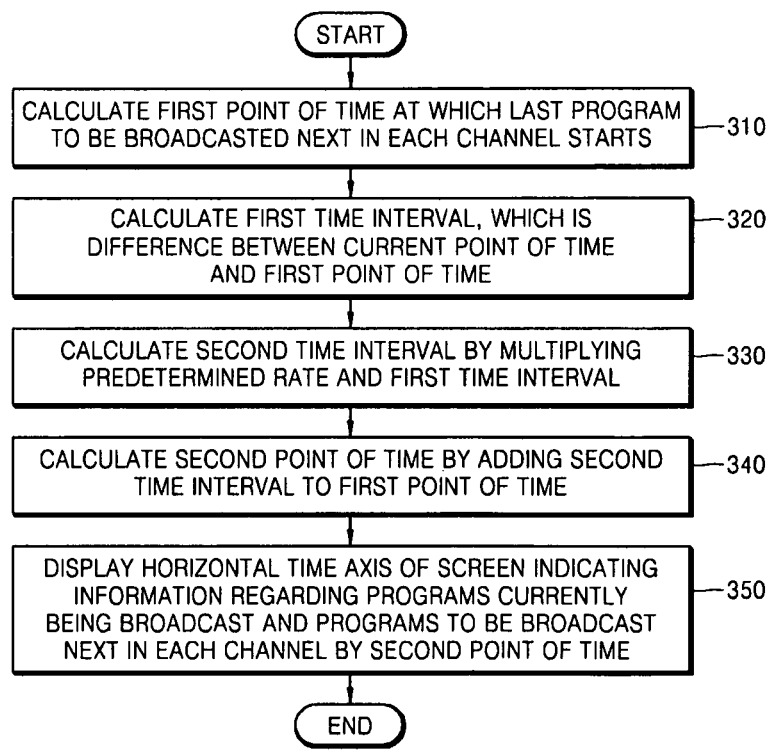
FIG. 3 is a flowchart of a method of calculating time intervals for time regions to display information regarding programs to be broadcast next.

FIG. 3 is a flowchart of a method of calculating time intervals for time regions to display information regarding programs to be broadcast next.

A method of displaying the NOW/NEXT EPG information 210 on a side of a screen according to the present embodiments includes calculating a first point of time T1 at which the last program to be broadcast next starts, and thus information regarding programs to be broadcast next in all channels is displayed on the TV screen based on the calculated first point of time T1, where the programs to be broadcast next will be referred to as second programs hereinafter.

At this point, instead of calculating a point of time at which the last one of programs to be broadcast next starts, an end point of time at which the last program currently being broadcast ends may be calculated, wherein the programs currently being broadcast will be referred to as first programs hereinafter.

Referring to FIG. 3, the point of time T1 at which the last one of the programs starts, where the programs are to be broadcasted next in each channel which is displayed on the NOW/NEXT EPG information 210, is calculated (operation 310).

Certain regions should be secured to display information, such as titles, regarding programs to be broadcast next including the last one of the programs, on a NOW/NEXT EPG screen. Thus, to calculate such regions, a first time interval D1, which is the difference between a current point of time C and the first point of time T1, is calculated (operation 320). A predetermined rate, which is a user-setting rate of displaying region of the current program to the next program on the screen, e.g. ½, is applied to the calculated first time interval D1 by multiplying the rate by the first time interval D1 to calculate a second time interval D2 (operation 330), and the second time interval D2 is added to the first point of time T1 to calculate a second point of time T2 (operation 340).

Finally, the time axis of a screen indicating information regarding programs to be broadcast next in each channel is displayed at the second point of time T2 (operation 350). In other words, the last point of time displayed in a screen is the second point of time T2.

Therefore, the time axis of the NOW/NEXT EPG screen is displayed by using the current point of time C and the second point of time T2, and information regarding programs currently being broadcast and programs to be broadcast next may be arranged and displayed along the time axis.

Thus, regardless of points of time at which programs to be broadcast next start, the size of the NOW/NEXT EPG information 210 displayed on a side of the TV screen 200 may be maintained constantly, and information regarding programs currently being broadcast and programs to be broadcast next may be presented regardless of a time slot arrangement of the original EPG.

Here, values of the predetermined rate may be, for example, ½, etc. However, the rate may be any value used to calculate the last point of time T2 of a time axis according to proportion of the NOW/NEXT EPG information 210 in the screen. Thus, a value of the rate may be changed according to the NOW/NEXT EPG information 210 arrangements, and the displaying size of the NOW/NEXT EPG information 210 may be changed according to a change of the rate.

Figure 4:
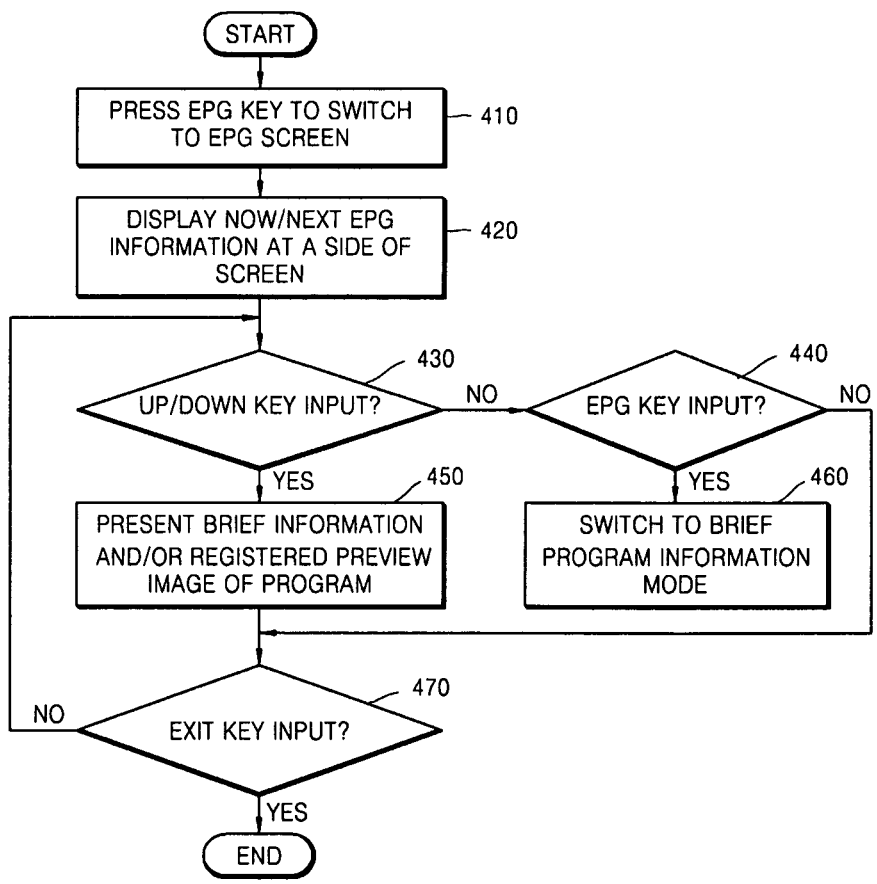
FIG. 4 is a flowchart of an interface operation using EPG information displayed on a screen of a digital broadcasting receiver, according to another embodiment.

FIG. 4 is a flowchart of an interface operation using EPG information displayed on a screen of a digital broadcasting receiver, according to another embodiment.

Referring to FIG. 4, the NOW/NEXT EPG information 210 may be displayed according to a user event, and operations as shown in FIG. 4 may be performed thereafter according to additional user events.

For example, when a user event switching to EPG screen mode is received by pressing an EPG key (operation 410), the NOW/NEXT EPG information 210 may be arranged and displayed on a side of the TV screen 200 instantly (operation 420).

Next, it is determined whether or not a user pressed either a UP key or a DOWN key (operation 430), for example, and brief information and/or a registered preview image of a corresponding program is presented (operation 450).

If a user pressed a hot key such as the EPG key after selecting a particular program in the EPG screen, it may be switched to a brief program information mode (operation 460). After the switching, as shown in FIG. 5, brief program information 510 is displayed.

Furthermore, it may be determined whether or not an EXIT key is pressed (operation 470). If the EXIT key is pressed, it may be switched back to a normal TV viewing mode from the EPG screen mode. Here, it is clear that the UP/DOWN keys may be replaced by other directional keys such as LEFT/RIGHT keys disposed on a user interface device for controlling a digital broadcasting receiver.

Figure 5:
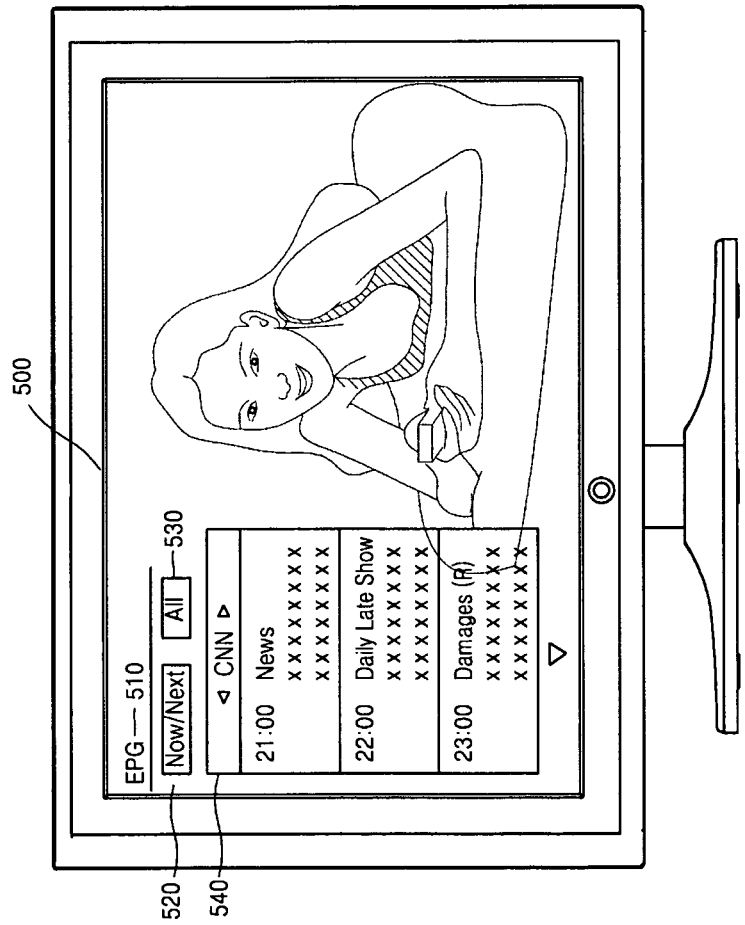
FIG. 5 is a diagram showing an example of brief EPG information of a channel, according to another embodiment.

FIG. 5 is a diagram showing an example of brief EPG information of a channel, according to another embodiment.

Referring to FIG. 5, brief EPG information 510 displays information regarding all programs in a channel of a currently selected program for all time slots. At this point, an ALL menu 530 is activated and displayed instead of a NOW/NEXT menu 520.

If a currently selected channel is CNN as indicated by a reference number 540 in FIG. 5, arrows to the left and right of the name of the channel show that there are more successive channels, thus indicating that a user can obtain information regarding programs in all channels (e.g., BBC, AFKN, KBS, etc.) by using directional keys such as LEFT/RIGHT keys.

Hereinafter, interface operations using such brief EPG information 510 will be described by referring to FIG. 6.

Figure 6:
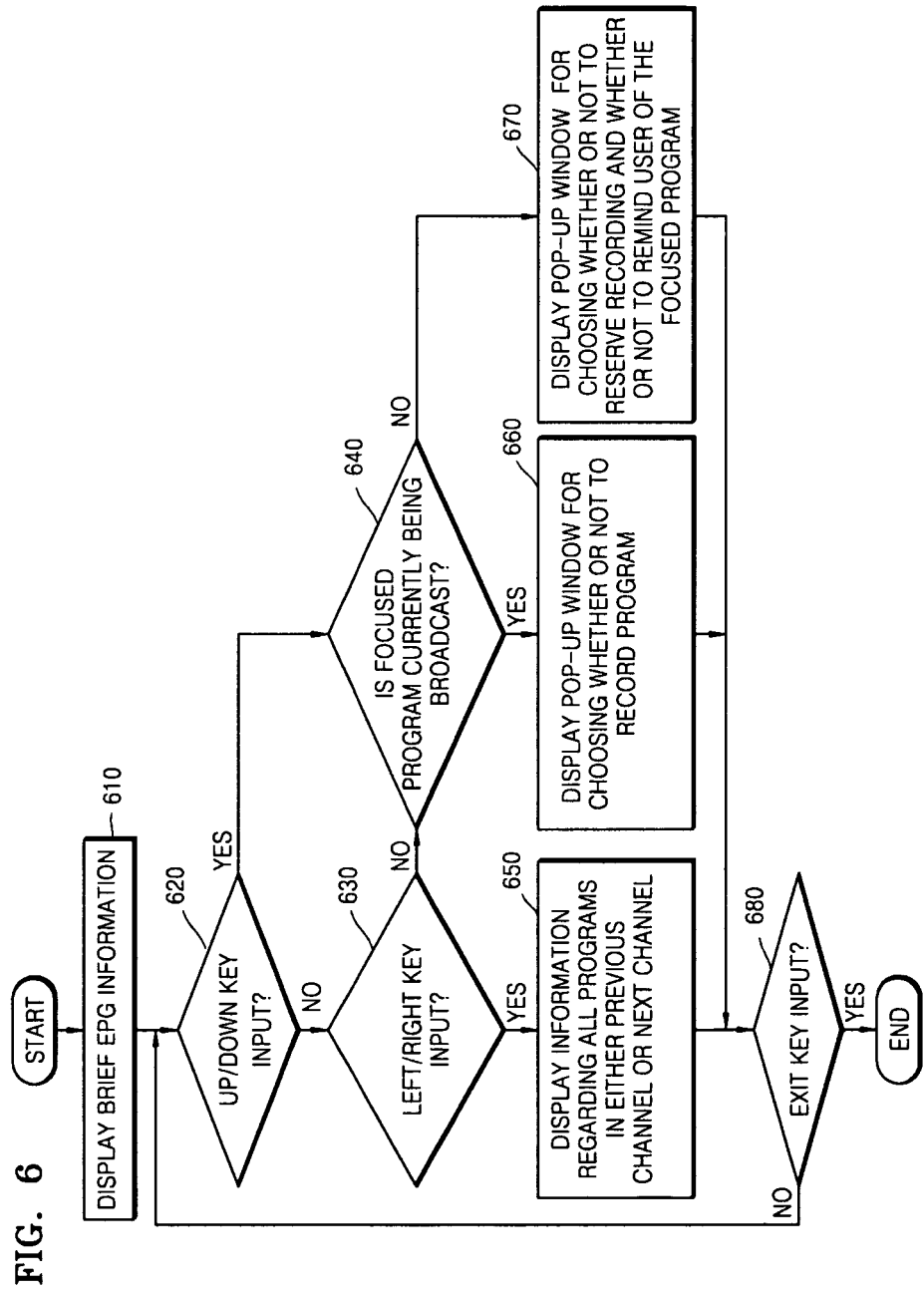
FIG. 6 is a flowchart of an interface operation using brief EPG information, according to another embodiment.

FIG. 6 is a flowchart of an interface operation using brief EPG information, according to another embodiment.

After a particular program is selected while the NOW/NEXT EPG information 210 is displayed, if either an EPG key or a hot key regarding brief EPG information is pressed, a brief EPG information screen, which displays information regarding all programs in a current channel along either the horizontal axis or the vertical axis of a screen, is displayed (operation 610).

For example, if it is determined that either an UP key or a DOWN key is pressed (operation 620), a focus moves in the brief EPG information. If a focus is located on information regarding a program currently being broadcast (operation 640), a pop-up window to choose whether to record the program or not is displayed (operation 660).

Furthermore, if recording is already in progress, a pop-up window to choose whether or not to cancel the recording may be displayed. When a focus is located on information regarding a program to be broadcast after the current time, a pop-up window to choose whether or not to reserve recording and whether or not to remind a viewer about a desired program is displayed (operation 670). Again, a pop-up menu to choose whether to cancel the choices may be displayed if the choices are already made.

Meanwhile, in the brief EPG information 540 of CNN, for example, shown in FIG. 5, if either a LEFT key or a RIGHT key is pressed, information regarding all programs in either a previous channel or a next channel (e.g., BBC, AFKN, etc.) is displayed in the same arrangement in a screen (operation 650). Furthermore, a TV screen may be switched if a program currently being broadcast in the switched channel is selected.

Meanwhile, it may be determined whether or not an EXIT key is pressed (operation 680), and the operations described above may be repeated. Here, the UP/DOWN/LEFT/RIGHT keys may be replaced by other directional keys disposed on a user interface device for controlling a digital broadcasting receiver.

Figure 7:
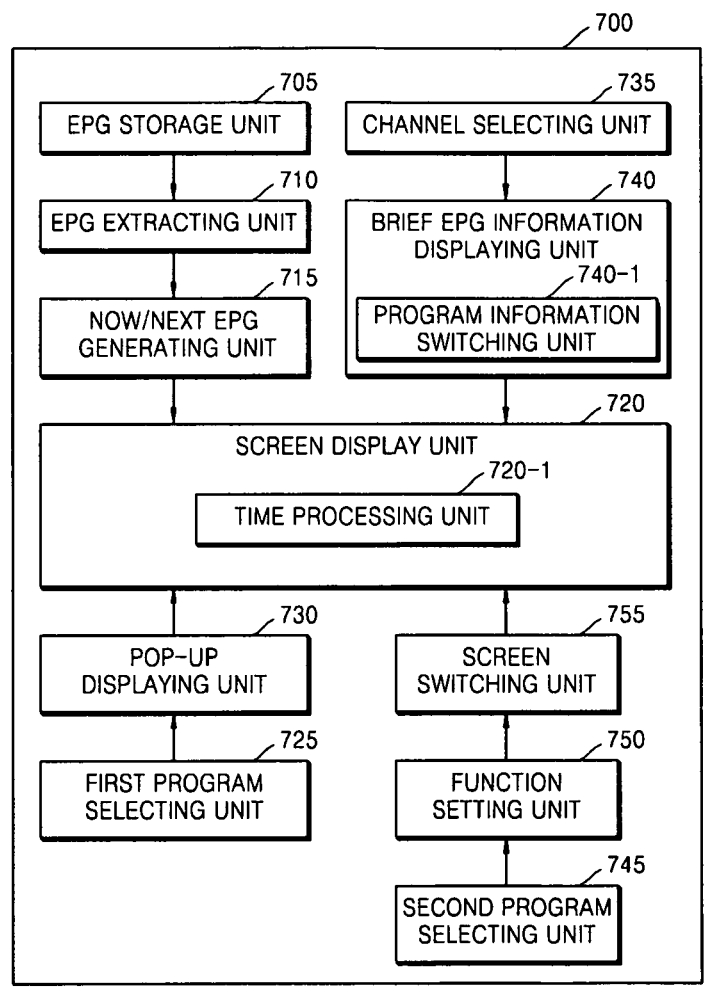
FIG. 7 is a functional block diagram of an apparatus to display EPG information on a screen of a digital broadcasting receiver, according to another embodiment.

FIG. 7 is a functional block diagram of an apparatus 700 to display EPG information on a screen of a digital broadcasting receiver, according to another embodiment.

Referring to FIG. 7, the apparatus 700 includes an EPG storage unit 705 obtaining EPG information, an EPG extracting unit 710 extracting information regarding programs in all channels from obtained EPG information, a NOW/NEXT EPG generating unit 715 generating NOW/NEXT EPG information, which is formed of information regarding programs currently being broadcast and programs to be broadcast next in each channel, based on extracted information, and a screen display unit 720 displaying generated NOW/NEXT EPG information and either a vertical line or a horizontal line indicating the current time.

Furthermore, the screen display unit 720 may further include a time processing unit 720-1 to calculate a first point of time T1 (which is a point of time at which a last second program in a channel starts), calculating a first time interval D1 (which is a difference between a current point of time C and the first point of time T1), calculating a second time interval D2 (which is calculated by applying a predetermined rate to the first time interval D1), and calculating a second point of time T2 (which is calculated by adding the second time interval D2 to the first point of time T1).

Furthermore, the apparatus 700 may further include a first program selecting unit 725 to select a program in channels displayed on a NOW/NEXT EPG information screen by using directional keys disposed on a user interface device to control a digital broadcasting receiver, and may further include a pop-up displaying unit 730 to display brief EPG information and/or related images regarding a selected program as pop-up windows.

The apparatus 700 may further include a channel selecting unit 735 to select a first channel by using hot-keys disposed on the user interface device, and may further include a brief EPG information displaying unit 740 to display program information regarding all programs in the selected first channel, per time slot.

Here, the brief EPG information displaying unit 740 may further include a program information switching unit 740-1 to switch the content of the brief EPG screen from program information of the first channel to program information of a second channel, which may be a channel either previous or next to the first channel.

Meanwhile, the apparatus 700 may further include a second program selecting unit 745 to select a predetermined program from displayed brief EPG information, a function setting unit 750 to set a recording function, a reserve recording function, or a reminding function with respect to a selected program, and a screen switching unit 755 to switch a screen of a digital broadcasting receiver by tuning to a program currently being broadcast.

According to various embodiments, users can always obtain information regarding programs currently being broadcast and programs to be broadcast next, which is EPG information most demanded by users, regardless of broadcasting program arrangements, and can determine when a program will start or end. Furthermore, viewing interruptions can be minimized.

Furthermore, even in the case of the brief EPG providing information regarding all programs in a current channel, information regarding programs in the current channel and previous/next channels can be easily obtained without operating a separate window or a tuner.

In addition, other embodiments can also be implemented through computer readable code/instructions in/on a medium, e.g., a computer readable medium, to control at least one processing element to implement any above described embodiment. The medium can correspond to any medium/media permitting the storage of the computer readable code.

The computer readable code can be recorded on a medium in a variety of ways, with examples of the medium including recording media, such as magnetic storage media (e.g., ROM, floppy disks, hard disks, etc.) and optical recording media (e.g., CD-ROMs, or DVDs). Thus, the medium may be such a defined and measurable structure. The media may also be a distributed network, so that the computer readable code is stored and executed in a distributed fashion. Furthermore, the processing element could include a processor or a computer processor, and processing elements may be distributed and/or included in a single device.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A method of providing broadcasting program information on a screen of a digital broadcasting receiver, the method comprising:
   displaying electronic program guide (EPG) information received by the digital broadcasting receiver, wherein the EPG information includes information regarding first programs currently being broadcast in each channel among all channels and a second program to be displayed next in a channel currently being displayed; and
   displaying a vertical line or a horizontal line indicating a current time on the screen,
   wherein the EPG information is displayed translucently on the screen to enable an image or other information to be visibly seen through the EPG information,
   the vertical line or the horizontal line is displayed on the EPG information regarding the first programs currently being broadcast to visualize the current time, and
   progress information of the first programs currently being broadcast are visualized on the screen by using a first color before the vertical line or the horizontal line and a second color after the vertical line or the horizontal line to indicate a remainder of time for the first programs currently being broadcast.

2. The method of claim 1, wherein the displaying of the EPG information and the line indicating the current time further comprises calculating a first point of time at which a last second program in each of the channels starts.

3. The method of claim 2, wherein the displaying of the EPG information and the line indicating the current time further comprises:
   calculating a first time interval by determining a difference between the current time and the first point of time;
   calculating a second time interval by multiplying a predetermined rate and the calculated first time interval;
   calculating a second point of time by adding the second time interval to the first point of time; and
   displaying a horizontal time axis of a screen displaying the EPG information within the second point of time.

4. The method of claim 3, wherein the screen of the EPG information is adjusted according to a predetermined proportion ratio in the displaying of the EPG information and the line indicating the current time.

5. The method of claim 3, wherein progress information of first programs currently being broadcast in each channel is displayed in the displaying of the EPG information and the line indicating the current time.

6. The method of claim 1, further comprising:
   receiving an input from a user using directional keys disposed on a user interface device to control the digital broadcasting receiver to select a first program or a second program in a channel from the EPG information; and
   displaying at least one of program information and related images regarding the selected first program or the second program as pop-up windows.

7. The method of claim 6, further comprising:
   receiving an input from a user using hot-keys disposed in a user interface device to select a first channel from among channels with respect to the first program or the second program; and
   displaying third program information including information regarding all programs in the selected first channel for all time slots on the screen.

8. The method of claim 7, further comprising replacing the displayed third program information by displaying fourth program information including information regarding all programs in a second channel for all time slots in response to the user using the directional keys disposed on the user interface device, the second channel being a channel before or after the first channel.

9. The method of claim 8, further comprising:
receiving an additional input from the user using the directional keys to select a third program in a channel in a time slot from the third program information or the fourth program information; and
setting a recording function, a reserve recording function, or a remind function with respect to the selected third program.

10. The method of claim 9, further comprising switching a screen of the digital broadcasting receiver by tuning to the first program or the third program, when the first program or the third program is currently being broadcast.

11. An apparatus to provide broadcasting program information on a screen of a digital broadcasting receiver, the apparatus comprising:
an electronic program guide (EPG) storage unit to obtain EPG information, wherein
the EPG information includes information regarding first programs currently being broadcast in each channel among all channels and second programs to be displayed next in a channel currently being displayed; and
a screen display unit to display the EPG information and a vertical line or a horizontal line indicating a current time in the screen,
wherein, the apparatus is configured to display the EPG information translucently on the screen to enable an image or other information to be visibly seen through the EPG information, to display the vertical line or the horizontal line on the EPG information regarding the first programs currently being broadcast to visualize the current time, and to visualize progress information of the first programs currently being broadcast on the screen by using a first color before the vertical line or the horizontal line and a second color after the vertical line or the horizontal line to indicate a remainder of time for the first programs currently being broadcast.

12. The apparatus of claim 11, wherein the screen display unit further comprises a time processing unit to calculate a first point of time at which a last second program in a channel starts.

13. The apparatus of claim 12, wherein the time processing unit calculates a first time interval by determining a difference between the current time and the first point of time, calculates a second time interval by multiplying a predetermined rate and the calculated first time interval, and calculates a second point of time by adding the second time interval to the first point of time, and
the screen display unit displays a horizontal time axis of a screen displaying the EPG information within the second point of time.

14. The apparatus of claim 13, wherein the screen display unit adjusts the screen of the EPG information according to a predetermined proportion ratio.

15. The apparatus of claim 13, wherein the screen display unit displays progress information of first programs currently being broadcast in each channel.

16. The apparatus of claim 13, further comprising:
a first program selecting unit to select a first program or a second program in channels displayed on a NOW/NEXT EPG information screen in response to an input by a user using directional keys disposed on a user interface device to control the digital broadcasting receiver; and
a pop-up displaying unit to display at least one of program information and related images regarding the selected first program or the second program as pop-up windows.

17. The apparatus of claim 16, further comprising:
a channel selecting unit to select a first channel from among channels with respect to the first program or the second program in response to an input from a user using hotkeys disposed on the user interface device; and
a brief EPG information displaying unit to display third program information regarding all programs in the selected first channel for all time slots.

18. The apparatus of claim 17, wherein the brief EPG information displaying unit further comprises a program information switching unit to switch from the displayed third program information to display fourth program information including information regarding all programs in a second channel for all time slots in response to the user using the directional keys disposed on the user interface device in the screen, the second channel being a channel before or after the first channel.

19. The apparatus of claim 18, further comprising:
a second program selecting unit to select a third program in a channel in a time slot from the third program information or the fourth program information in response to an additional input from a user using the directional keys; and
a function setting unit to set a recording function, a reserve recording function, or a remind function with respect to the selected third program.

20. The apparatus of claim 19, further comprising a screen switching unit to switch a screen of the digital broadcasting receiver by tuning to the first program or the third program when the first program or the third program is currently being broadcast.

21. A non-transitory computer readable recording medium having recorded thereon a computer program to cause a processor to execute the method of claim 1.

22. A method of providing broadcasting program information on a screen of a digital broadcasting receiver, the method comprising:
displaying electronic program guide (EPG) information received by the digital broadcasting receiver, wherein the EPG information includes first programs currently being broadcast and second programs to be broadcast next in each of a plurality of channels; and
displaying an indicator indicating a current time on the screen,
wherein the EPG information includes program information regarding the first programs and the second programs and is displayed translucently on the screen to enable an image or other information of content of a first program currently being displayed on the screen to be visibly seen through the EPG information,
EPG information for the first program before the indicator is displayed using a first color, and
EPG information for the first program after the indicator and EPG information for a second program to be broadcast next in a same channel as the first program are displayed using a second color.

23. The method of claim 22, wherein the EPG information displayed on the screen is adjusted according to a predetermined proportion ratio.

24. The method of claim 22, wherein the displaying of the EPG information includes displaying progress information of first programs currently being broadcast in each channel, and the indicator indicating the current time on the screen is a vertical line or a horizontal line.

25. The method of claim 22, further comprising:
receiving a user input to select a first program or a second program in a channel from the EPG; and
displaying at least one of program information and related images regarding the selected first program or the selected second program as pop-up windows.

26. The method of claim 25, further comprising:
receiving a user input to select a first channel from among channels with respect to the selected first program or the selected second program; and
displaying second EPG information regarding all programs in the selected first channel for all time slots on the screen.

27. The method of claim 26, further comprising replacing the second EPG by displaying a third EPG including information regarding all programs in a second channel for all time slots in response to a user input to select the second channel, the second channel being a channel before or after the first channel.

28. The method of claim 27, further comprising:
receiving a user input to select a third program from the second EPG or the third EPG; and
setting a recording function, a reserve recording function, or a remind function with respect to the selected third program.

29. The method of claim 28, further comprising tuning to the first program or the third program, when the first program or the third program is currently being broadcast.

30. An apparatus to provide broadcasting program information on a screen of a digital broadcasting receiver, the apparatus comprising:
a screen to display electronic program guide (EPG) information received by the digital broadcasting receiver, wherein the EPG information includes first programs currently being broadcast and second programs to be broadcast next in each of a plurality of channels, and to display an indicator indicating a current time,
wherein the EPG information includes program information regarding the first programs and the second programs and is displayed translucently on the screen to enable an image or other information of content of a first program currently being displayed on the screen to be visibly seen through the EPG information,
EPG information for the first program before the indicator is displayed using a first color, and
EPG information for the first program after the indicator and EPG information for a second program to be broadcast next in a same channel as the first program are displayed using a second color.

31. The apparatus of claim 30, wherein the EPG information displayed on the screen is adjusted according to a predetermined proportion ratio.

32. The apparatus of claim 30, wherein progress information of first programs currently being broadcast in each channel is displayed and the indicator indicating the current time on the screen is a vertical line or a horizontal line.

33. The apparatus of claim 30, further comprising:
a first program selecting unit to select a first program or a second program in a channel from the EPG; and
a pop-up displaying unit to display at least one of program information and related images regarding the selected first program or the selected second program as pop-up windows.

34. The apparatus of claim 33, further comprising:
a channel selecting unit to select a first channel from among channels with respect to the selected first program or the selected second program; and
an EPG information displaying unit to display second EPG information regarding all programs in the selected first channel for all time slots on the screen.

35. The apparatus of claim 34, wherein the EPG information displaying unit further comprises a program information switching unit to replace the second EPG by displaying a third EPG including information regarding all programs in a second channel for all time slots in response to a user input to select the second channel, the second channel being a channel before or after the first channel.

36. The apparatus of claim 35, further comprising:
a third program selecting unit to select a third program from the second EPG or the third EPG; and
a function setting unit to set a recording function, a reserve recording function, or a remind function with respect to the selected third program.

37. The apparatus of claim 36, further comprising a screen switching unit to switch a screen of the digital broadcasting receiver by tuning to the first program or the third program, when the first program or the third program is currently being broadcast.

38. A method of providing broadcasting program information on a screen of a digital broadcasting receiver, the method comprising:
displaying electronic program guide (EPG) information received by the digital broadcasting receiver;
displaying a geometric shape indicating a current time of day on the screen,
wherein progress information of the program currently being broadcast is visualized on the screen by using a first color before the current time of day and a second color after the current time of day to indicate a remainder of time for the program currently being broadcast, and
progress information of at least one program different from the program currently being broadcast in a same channel as the program currently being broadcast is also visualized on the screen using either the first color or the second color.

39. The method of claim 38, wherein the EPG information displayed on the screen is adjusted according to a predetermined proportion ratio.

40. The method of claim 38, wherein the geometric shape indicating the current time of day on the screen is a vertical line or a horizontal line.

41. An apparatus to provide broadcasting program information on a screen of a digital broadcasting receiver, the apparatus comprising:
an electronic program guide (EPG) storage unit to store EPG information; and
a screen display unit to display the EPG information and a geometric shape indicating a current time of day in the screen,
wherein the apparatus is configured to visualize progress information of the program currently being broadcast on the screen by using a first color before the current time of day and a second color after the current time of day to indicate a remainder of time for the program currently being broadcast, and is also configured to visualize progress information of at least one program different from the program currently being broadcast in a same channel as the program currently being broadcast on the screen using either the first color or the second color.

42. The apparatus of claim 41, wherein the EPG information displayed on the screen is adjusted according to a predetermined proportion ratio.

43. The apparatus of claim 41, wherein the geometric shape indicating the current time of day on the screen is a vertical line or a horizontal line.

44. A non-transitory computer readable recording medium having recorded thereon a computer program to cause a processor to execute the method of claim 38.

45. A method of providing broadcasting program information on a screen of a digital broadcasting receiver, the method comprising:

obtaining electronic program guide (EPG) information;

generating program information about a program currently being broadcast per channel based on the obtained EPG information;

displaying the generated program information; and distinguishably displaying a region that has been broadcast and a region that is not yet broadcast in different colors based on a current time so as to display progress information of the program currently being broadcast, wherein a boundary formed by distinguishably displaying the regions indicates the current time, and progress information of least one program different from the program currently being broadcast in a same channel as the program currently being broadcast is also visualized on the screen using one of the different colors.

46. The method of claim 45, wherein the boundary is a vertical line.

47. An apparatus to provide broadcasting program information on a screen of a digital broadcasting receiver, the apparatus comprising:

an electronic program guide (EPG) storage unit obtaining EPG information;

an EPG generating unit generating program information about a program currently being broadcast per channel based on the obtained EPG information;

a screen display unit displaying the generated program information, and distinguishably displaying a region that has been broadcast and a region that is not yet broadcast in different colors based on a current time so as to display progress information of the program currently being broadcast, wherein a boundary formed by distinguishably displaying the regions indicates the current time, and progress information of least one program different from the program currently being broadcast in a same channel as the program currently being broadcast is also visualized on the screen using one of the different colors.

48. The apparatus of claim 47, wherein the boundary is a vertical line.

49. A non-transitory computer readable recording medium having recorded thereon a computer program to cause a processor to execute the method of claim 45.

\* \* \* \* \*